United States Patent [19]

Cameron et al.

[11] 3,933,960

[45] Jan. 20, 1976

[54] METHOD OF EXTRUDING FIBER REINFORCED PLURAL LAYERED PLASTIC TUBES

[75] Inventors: James Brisbane Cameron; Bernard Piet Walton Knight, both of London, England

[73] Assignee: BTR Industries Limited, London, England

[22] Filed: Nov. 30, 1973

[21] Appl. No.: 420,637

Related U.S. Application Data

[63] Continuation-in-part of Ser. No. 178,610, Sept. 8, 1971, abandoned.

[30] Foreign Application Priority Data

Sept. 11, 1970 United Kingdom............. 43611/70

[52] U.S. Cl.............. 264/108; 264/173; 264/209; 264/210; 264/280; 264/290
[51] Int. Cl.² ........................................ B29D 23/04
[58] Field of Search .......... 264/209, 173, 210, 280, 264/290, 108, 174; 425/382.2, 463, 133

[56] References Cited
UNITED STATES PATENTS

| | | | |
|---|---|---|---|
| 2,736,921 | 3/1956 | Mulbarger et al. ................ | 264/209 |
| 2,973,783 | 3/1961 | Boe.................................... | 264/209 |
| 3,181,201 | 5/1965 | Seiz.................................... | 425/463 |
| 3,281,897 | 11/1966 | Mercer .............................. | 264/209 |
| 3,296,661 | 1/1967 | Moustier............................ | 264/209 |
| 3,375,548 | 4/1968 | Kido et al. ...................... | 425/382.2 |
| 3,561,493 | 2/1971 | Maillard............................. | 425/133 |

OTHER PUBLICATIONS

Perry et al., Chemical Engineer's Handbook, McGraw–Hill, N.Y., (1963), pp. 5-15, 5-16, 5-30, 5-31, 5-32.
Walker et al., Principles of Chemical Engineering, McGraw–Hill, N.Y., (1937) pp. 58-59.

*Primary Examiner*—Robert F. White
*Assistant Examiner*—Willard E. Hoag
*Attorney, Agent, or Firm*—Watson, Cole, Grindle & Watson

[57] ABSTRACT

The specification discloses a method of making a reinforced tube comprising continuously extruding at least one viscous material having reinforcing fibres therein through two concentric sets of discrete passages, producing laminar flow in the passages by causing the material to accelerate on entry into the passages and preventing deceleration thereof within the passages whereby the fibres orientate themselves in the material lengthwise of the passages, and bringing together the extruded material from the respective passages so as to form two layers of material one within the other having fibres lying on helices of opposite hands respectively and simultaneously hauling-off the extruded layers at a regulated rate to control the angle of the helices on which the fibres lie, and allowing said layers to consolidate into a single tube.

15 Claims, 13 Drawing Figures

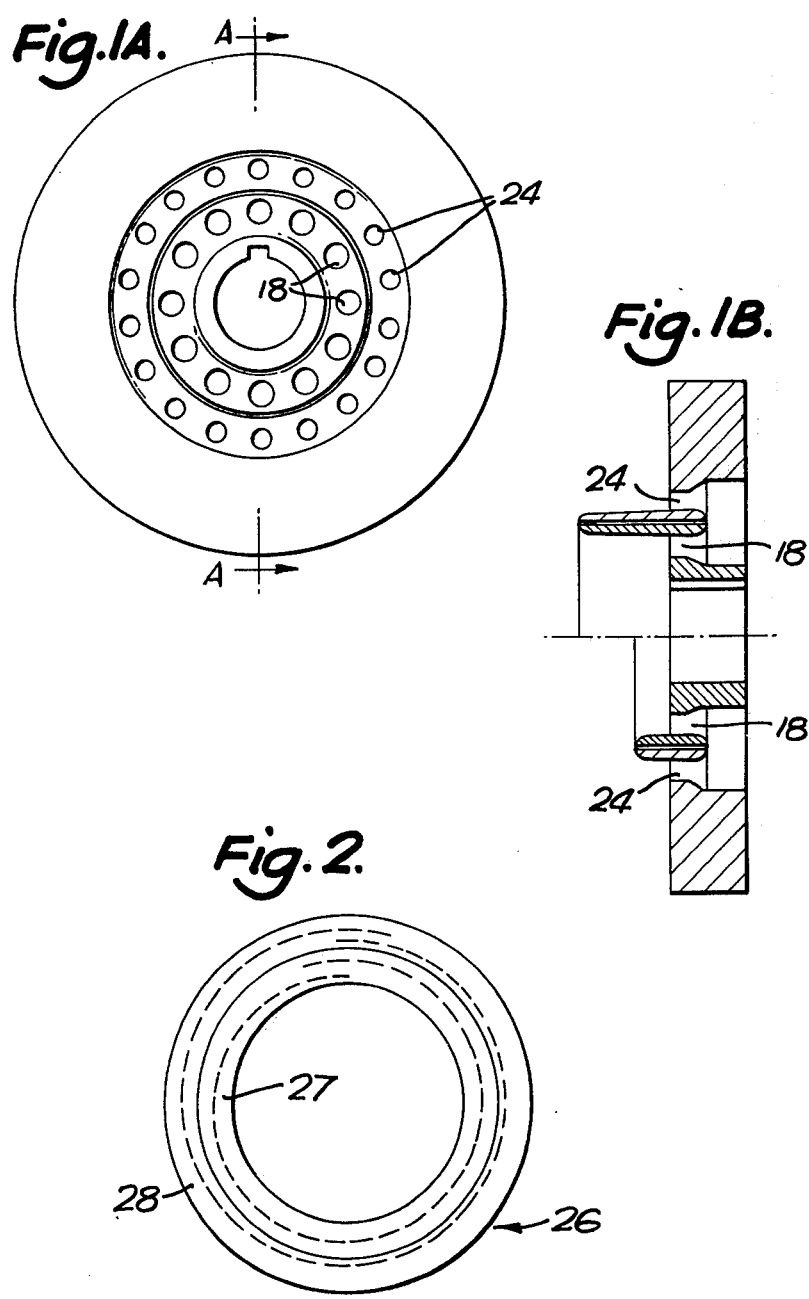

3,933,960

METHOD OF EXTRUDING FIBER REINFORCED PLURAL LAYERED PLASTIC TUBES

CROSS REFERENCE TO RELATES APPLICATION

This application relates to methods and apparatus for making reinforced tubes and is a continuation-in-part application to our co-pending application Ser. No. 178,610 filed on Sept. 8, 1971 entitled "Methods and apparatus for making tubes", and now abandoned.

BACKGROUND TO THE INVENTION

Mercer discloses in his U.S. Pat. No. 3,281,897 an extrusion apparatus for extruding plastics tubing having two concentric sets of contra-rotating passages through which a plastics material flows during extrusion of the tubing. Mercer, however, unlike the applicants is not concerned with extruding a viscous material containing reinforcing fibres. When such fibres are included it has been found to be desirable that they should be orientated lengthwise of the extrusion passages so that when material issuing from the passages is wound helically the fibres will lie on helices of the opposite hand, the angles of which helices are controlled to give optimum burst strength and resistance to axial deformation of the finished tube. However, in Mercer's apparatus as shown in his FIGS. 5 and 6, the die entries comprise sharp edges and produce a sudden contraction of the flow at the entries of extrusion passages. The edges will generate vortices and hence cause turbulence in the viscous material due to the flow path of the material through the dies. Further, the sharp contraction of the flow on entry to the passages will produce a Vena Contracta in the flow downstream of the die entries which results in deceleration of the flow beyond the Vena Contracta with the result that the flow becomes turbulent. Moreover when fibres are included in the viscous material, they tend to engage the sharp edges and may be rotated to bridge the entry to the dies or tumble as they flow through the passages. Therefore the method and apparatus disclosed by Mercer although suitable for extruding a plastics material is not suitable for extruding such material when containing reinforcing fibres to produce a tube in which the fibres are orientated on helices of opposite hands having critical angles to give optimum strength to the tube.

SUMMARY OF THE INVENTION

The invention provides a method of making a reinforced tube comprising continuously extruding at least one viscous material having reinforcing fibres therein through two concentric sets of converging discrete passages, producing laminar flow in the passages by causing the material to accelerate on entry into the passages and preventing deceleration thereof within the passages whereby the fibres orientate themselves in the material lengthwise of the passages, and bringing together the extruded material from the respective passages so as to form two layers of material one within the other having fibres lying on helices of opposite hands respectively and simultaneously hauling-off the extruded layers at a regulated rate to control the angle of the helices on which the fibres lie, and allowing said layers to consolidate into a single tube.

The Applicants have found that it is advantageous if the length/diameter ratio of the extrusion passages does not exceed 10 in order to preserve the orientation of the fibres in the passages.

The Applicants have further found that it is advantageous for the volume flow rate of material through the inner set of passages to be equal to or greater than that through the outer set of passages so that the two oppositely wound layers of the final tube have similar strengths and resistance to deformation which balance one another and provide the tube with the required burst strength and resistance to axial deformation. This is achieved by making the total cross-sectional areas of the passages of the inner set of passages equal to or greater than that of the passages of the outer set.

In order to achieve the required laminar flow in the extrusion passages, the Applicants have found it desirable to gradually constrict the viscous material into the openings of the passages.

BRIEF DESCRIPTION OF THE DRAWINGS

FIG. 1A is a cross-section taken through the concentric dies of the apparatus of FIG. 1;

FIG. 1B shows in its upper part a cross-section along the line A—A in FIG. 1A and in its lower part a similar cross-section showing an alternative design of extrusion passages;

FIG. 2 is a cross-section through a tube made by the apparatus of FIG. 1;

DETAILED DESCRIPTION

Figure 1:
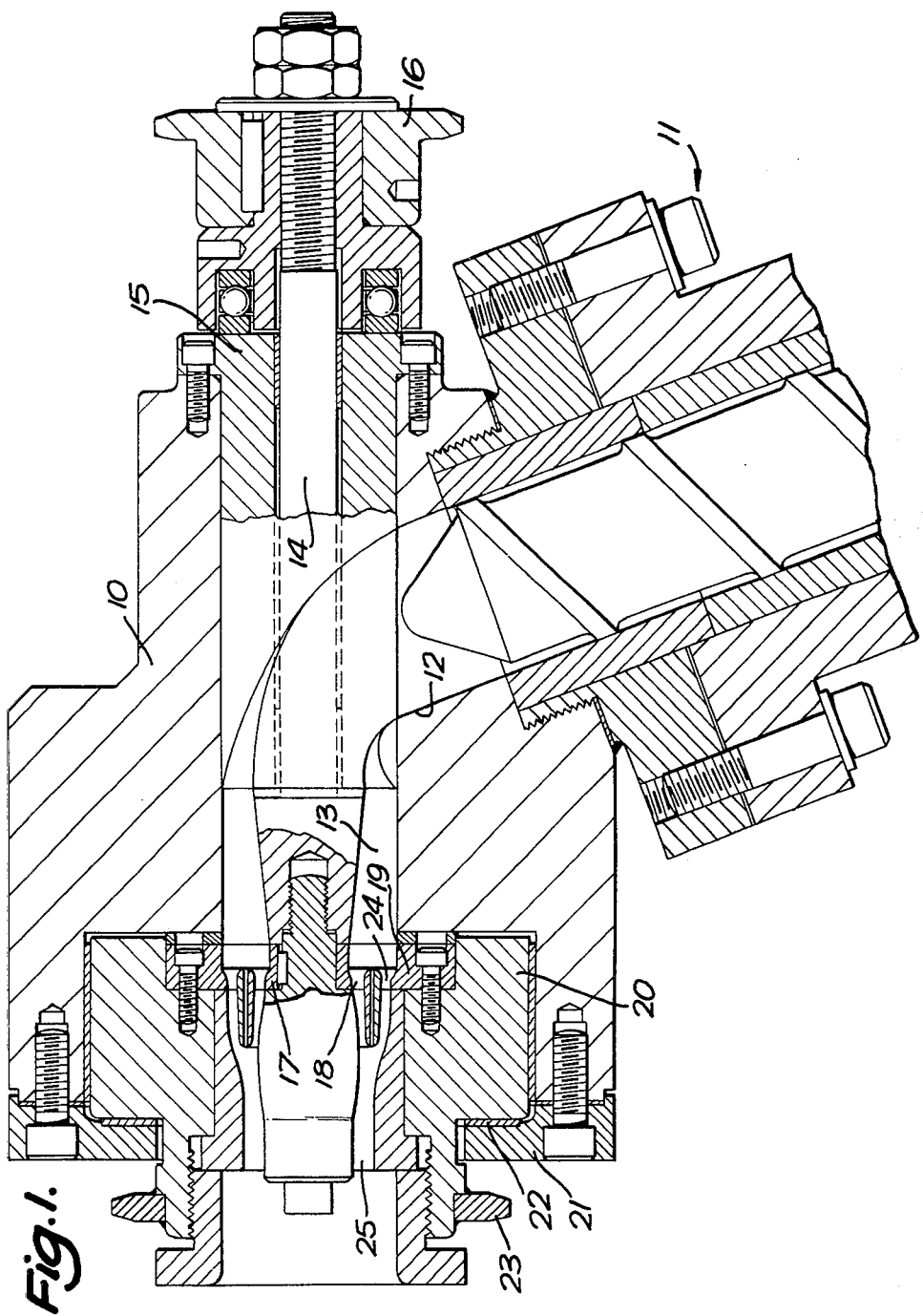
FIG. 1 is a cross-section through an apparatus for making tubes having rotatable concentric extrusion dies.

The extruding apparatus shown in FIGS. 1, 1A and 1B comprises a housing 10 having a screw extruder assembly 11 connected to one side of the housing. The housing has a duct 12 communicating with the screw extruded and leading to an annular extrusion gallery 13. A shaft 14 extends axially through the housing and is rotatably supported in a bore of an elongate end cap 15 which closes the right hand end of the housing bore. The shaft extends beyond the end cap and has a sprocket wheel 16 fixed on it so that the shaft can be rotated by an electric motor.

An inner extrusion die 17 is secured to the left hand end of the shaft to rotate therewith. The die 17 is formed with a plurality of elongate passages 18 extending therethrough and having a length/diameter ratio of less than 10 parallel to the shaft 14.

An outer extrusion die 19 is fixed to an annular part 20 mounted in an enlarged diameter end portion of the housing bore for rotation on the inner die 17. The part 20 is located axially by an end plate 21 secured to the housing with a thrust bearing 22 provided between the plate 21 and the part 20. The part 20 has an annular axial extrusion protruding from the housing on which a sprocket wheel 23 is fixed so that the outer die can be rotated on the inner die 17 in the opposite direction to the inner die.

A plurality of generally cylindrical elongate passages 24 are formed through the die 19 extending parallel to the passages 18 on the inner die and have a length-/diameter ratio of less than 10. The passages 18 and 24 define paths from the extrusion gallery 13 to a cylindrical tube forming gallery 25.

Referring to FIG. 1A, balanced volume flow rates of material through the inner sets of passages 18 and the outer sets of passages 24 respectively is produced by providing more passages in the outer set each of which has a smaller cross-sectional area to that of each passage in the inner set such that the total cross-sectional area of the inner set of passages is the same or, if desired, greater than that of the outer set of passages.

The upper half of FIG. 1B shows the embodiment of FIG. 1 while the lower half of FIG. 1B shows another embodiment in which the length of the streamlining walls downstream of passages 18 and 24 are reduced.

In order to use the above described apparatus, the screw-extruder 11 delivers a matrix of a viscous material having reinforcing fibres distributed through its bulk to gallery 13. The reinforcing fibres are in approximately equal discrete lengths.

The dies 17 and 19 are rotated, and the material is extruded into the tube forming gallery 25 from the gallery 13 through the passages 18 and 24. The shape of the passages 18 and 24 is such that the viscous material is in a state of laminar flow through them so that the fibres in the material are accelerated into the passages and do not decelerate in the passages, and therefore the fibres in the viscous material tend to orientate themselves along the length of the passages. The two sets of passages 18 and 24 each extrude into the gallery 25 a set of lengths of the viscous material, the lengths being wound to form two multi-start helically wound tubes, one within the other, and the strands lying in the material of each tube on a helix, the helix of one tube being of an opposite hand to that of the other. As the two tubes pass through the annular passage 25 they are urged into contact with one another, and as the viscous material sets, are bonded together. The product emerging from the apparatus is a single tube 26 (FIG. 2) having reinforcement in the form of discrete fibres in two discrete layers, an inner layer 27 and an outer layer 28 of oppositely handed helices.

The extruding apparatus comprises a housing 29 (FIG. 3) having a duct 30 leading from a reservoir. At the end 31 of the duct 30 is a conical projection 32, and further ducts (not shown) leading to an annular extrusion gallery 33. A shaft 34 is secured to the end 31 of the duct 30 by means of a nut 35 located behind the projection 32, there being an inner extrusion die 36 mounted for rotation on the shaft.

The die 36 has a toothed portion 37 adjacent the end 31, which is engaged by a worm wheel 38 carried on a shaft 39 mounted for rotation in the wall of the housing 29. A bevel gear 40 is carried on the outer extremity of shaft 39, and is engaged by a similar bevel gear 41 secured to a driving shaft 42 extending parallel to the shaft 39. Means (not shown), such as an electric motor, is drivingly connected to the driving shaft 42, and has a variable output speed.

The die 36 has a cylindrical portion 43 the outer part 44 of which projects into the gallery 33, and is formed with a plurality of elongated generally cylindrical passages 45 extending therethrough parallel to the shaft 34.

An outer extrusion die 46 is mounted for rotation on the cylindrical outer surface of outer part 44 of the die 36, and is located axially by means of a channel 47 formed in the wall of the housing 29. The outer surface of the second die 46 is toothed, which toothed portion is engaged by a gear wheel 48 attached to the end of the driving shaft 42.

A plurality of generally cylindrical elongated passages 49 are formed through the die 46 extending parallel to the passages 45 in the inner die 43. The passages 45 and 49 define converging paths from the extrusion gallery 33 to a cylindrical tube forming gallery 50, which has an annular die 50a leading axially away therefrom. The passages 45 and 49 have a length/diameter of less than 10 to preserve the orientation of the fibres in the passages.

The pitch of the worm, and the numbers of teeth on the gear wheels may be so arranged that when shaft 42 is driven by the means therefor, the die 43 rotates at a speed equal to or greater than that of die 46 but in the opposite direction.

The above described apparatus is used in a manner similar to that described for the FIG. 1 embodiment. The reservoir (not shown) is filled with a matrix of a viscous material having reinforcing fibres distributed throughout its bulk. The reservoir is pressurised by means (not shown) so that the material is forced into the extrusion gallery 33 and then through passages 45 and 49 which are rotated. The material is extruded into the tube forming gallery 50 in which the layers of material extruded through the passages 45 and 49 are consolidated into a single tube having reinforcement in the form of discrete fibres arranged in two discrete layers, an inner layer and an outer layer 42 of oppositely handed helixes.

Figure 3:
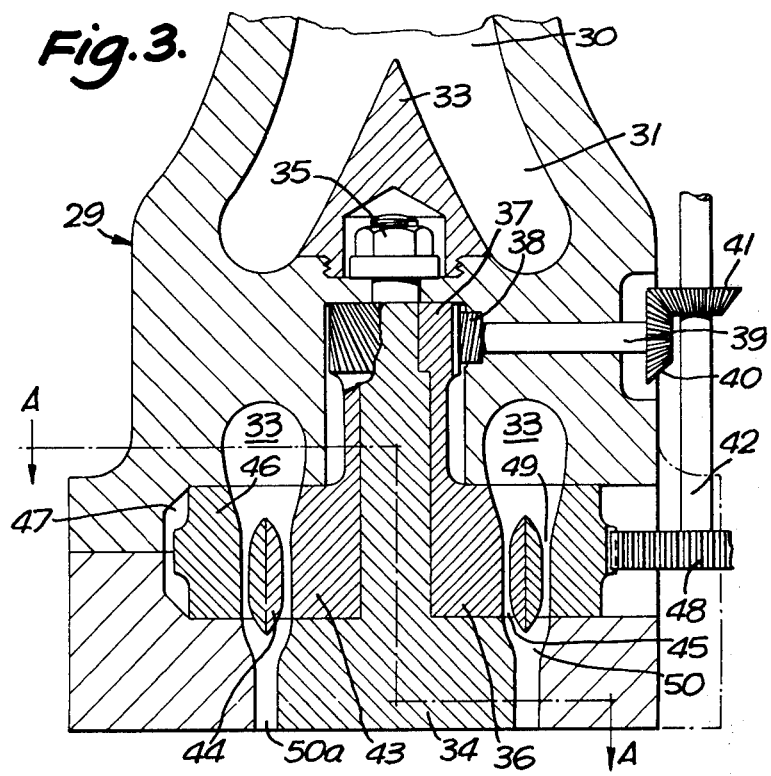
FIG. 3 is a cross-section through a second embodiment.
Figure 3A:
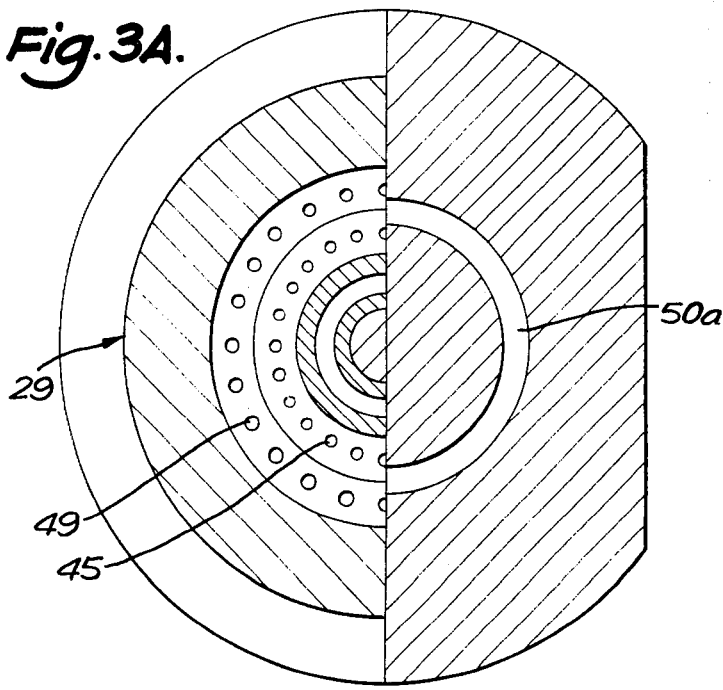
FIG. 3A is a cross-section along the line A—A in FIG. 3.

FIG. 3A shows that the same number of passages 45, 49 having the same cross-sectional diameter are provided in the inner and outer sets of passages respectively. This provides balanced flow rates through the inner set of passages and the outer set of passages.

Figure 4:
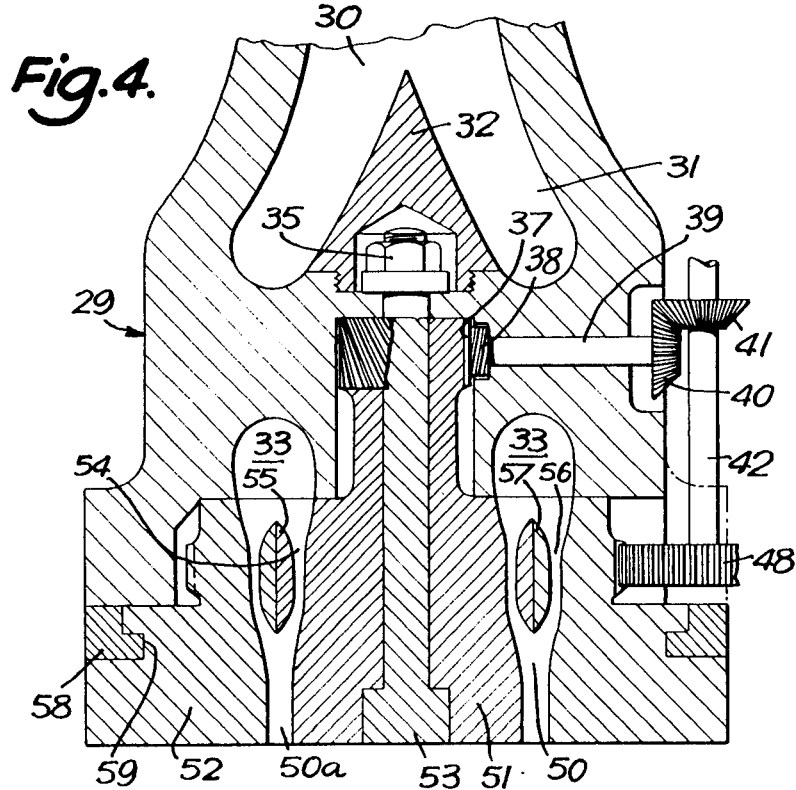
FIG. 4 is a cross-section through a third embodiment.

Referring now to FIG. 4, a third embodiment of extruder is shown, in which parts common to the extruder shown in FIG. 3 are given like reference numerals. The inner and outer extrusion dies 51 and 52 extend downwardly, and are shaped so that together the annular die 50, 50a through which the extruded material passes is defined thereby. The inner extrusion die 51 is rotatably mounted on a bolt 53 which is attached to the housing 29, and has a plurality of extrusion passages 54 formed adjacent an outer cylindrical wall 55. The outer extrusion die 52 is provided with a plurality of extrusion passages 56 formed adjacent an inner cylindrical wall 57 which fits closely around the wall 55 of the die 51 such that the die 52 may rotate with respect to the die 51 and is located radially thereby. The die 52 is located axially by means of a lip 58 engaging with an annular groove 59 formed around the outer periphery of the die. Drive means similar to that provided for the first described embodiment of extruder are provided for the dies 51 and 52.

The apparatus is used in a manner substantially similar to that of the embodiment of FIG. 3. However, during winding of the tubes, the helical orientation of the fibres is created in the forming gallery 50, and is then maintained, and improved insofar as the surfaces of the tube is concerned, by the shear of material against the walls of the annular die 50a.

In a modification of the above apparatus (not shown), the two pluralities of passages 54 and 56 are replaced by two annular passageways, one in each die respectively.

The annular passageways are substantially continuous except for bridging strips to connect the walls 55 and 57 to the respective dies 51 and 52. Alternatively, the passages 54 and 56 may be arcuately elongated.

Figure 4A:
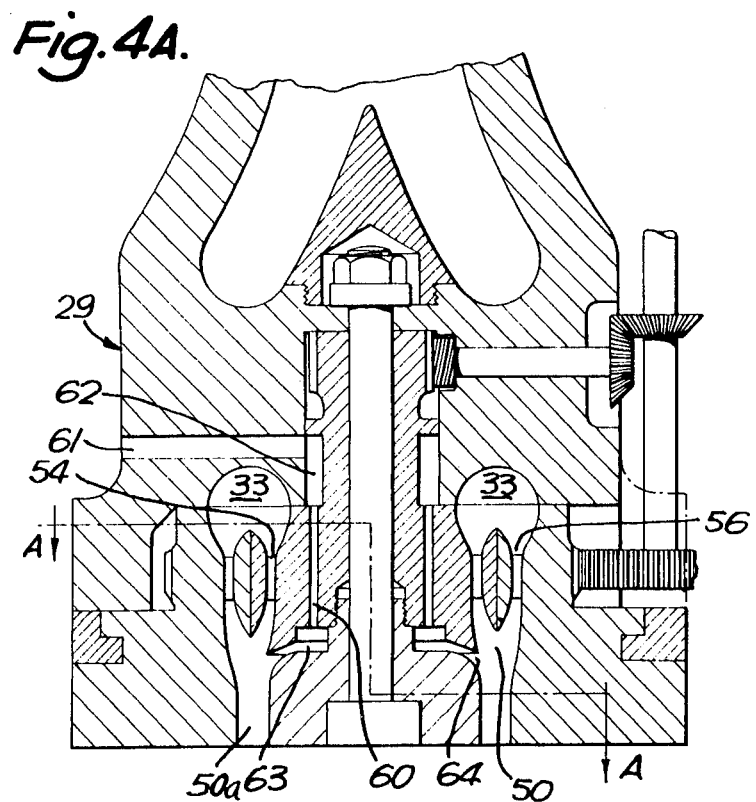
FIG. 4A is a cross-section through a fourth embodiment.
Figure 4B:
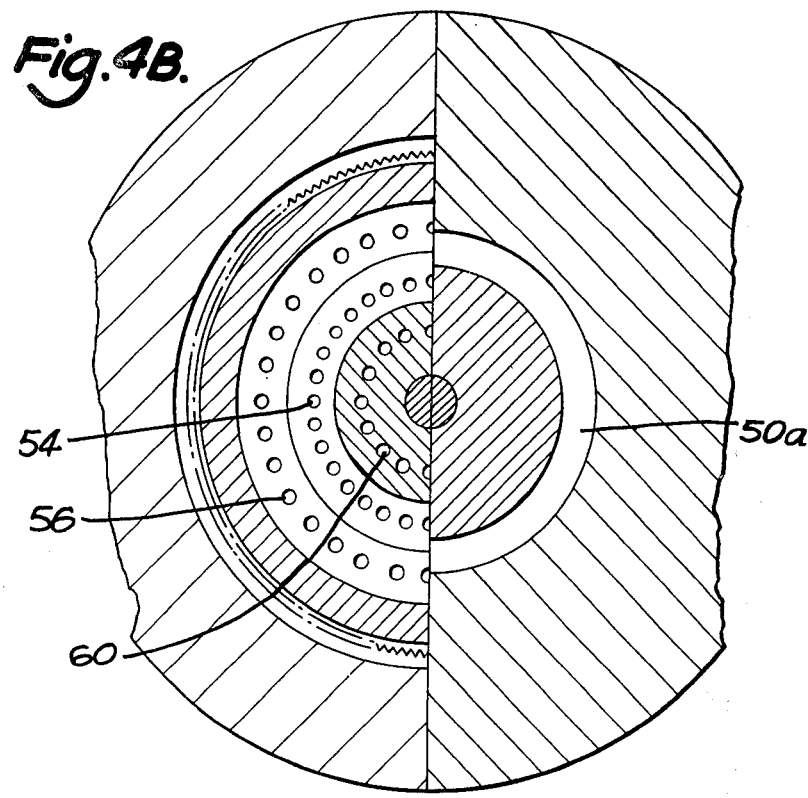
FIG. 4B is a cross-section along the line A—A in FIG. 4A.

Referring to FIGS. 4A and 4B, there is shown an apparatus similar to FIG. 4 in which a further annular series of passages 60 are provided in the inner die 51. A material different from the tube material is introduced from a separate extruder into inlet passage 61 and collects in an annular space 62 from which it passes into passages 60. The material extruded through passages 60 collects in a further annular space 63 from which it is fed through passage 64 to form a barrier layer on the inside of the formed tube.

Figure 5:
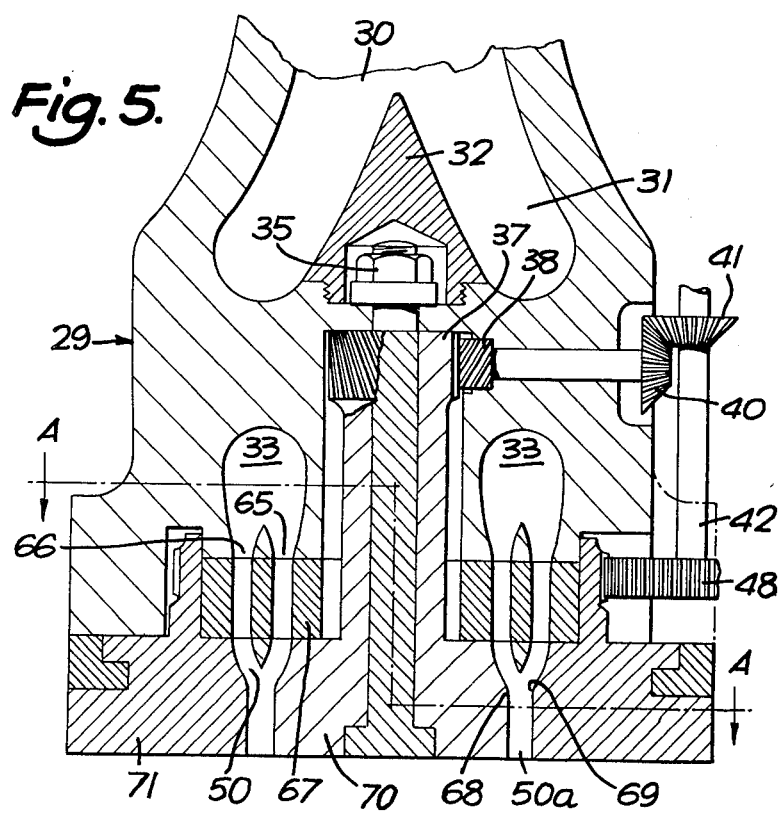
FIG. 5 is a cross-section through a fifth embodiment.
Figure 5A:
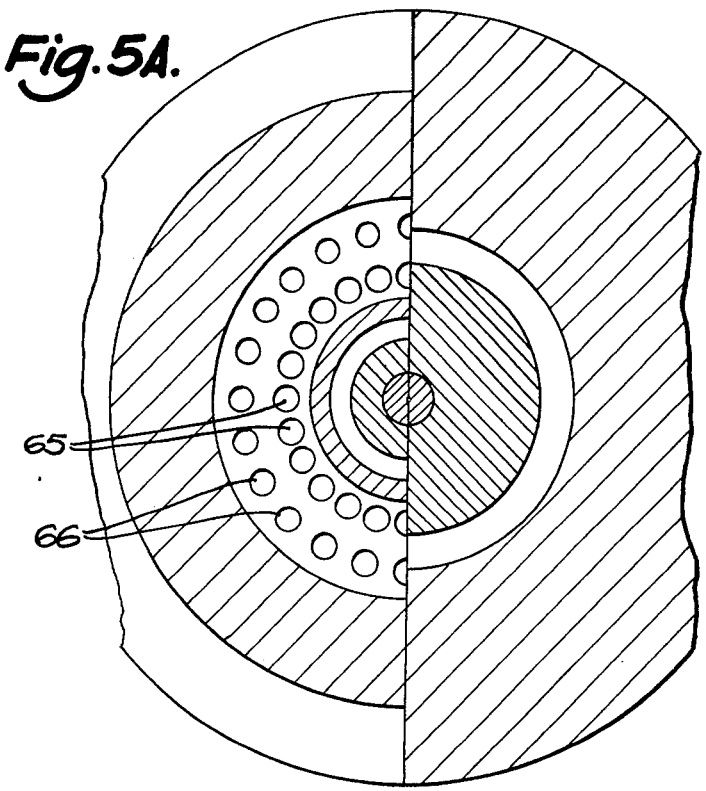
FIG. 5A is a cross-section along the line A—A in FIG. 5.

Referring to FIGS. 5 and 5A, a further embodiment of extruder is shown, and parts common to the extruders of FIGS. 3 and 4 are given like reference numerals. The two sets of extrusion passages 65 and 66 are provided in a die block 67 which is held stationary with respect to the housing 29. The annular forming gallery 50 and the annular die 50a are defined by the outer and inner walls 68 and 69 respectively of the inner and outer dies 70 and 71, there being drive means to rotate the two dies in opposite senses as in the previously described embodiments. The passages 65 and 66 need not be disposed parallel to the dies as shown, but may be helically formed or at an angle to the axis of the dies. In use, the material is extruded through the two sets of passages 65 and 66, and the extruded material formed into two tubes within the forming gallery 50 by virtue of the shear between the extruded material and the contra-rotating walls 68 and 69 of the two dies 70 and 71. As seen in FIG. 5A, the same number of passages having the same cross-sectional area are provided in the inner set and outer set of passages respectively.

It will be appreciated that in any of the above embodiments of extrusion apparatus, the angle of the helixes is a function of the number of passages in each die, the extrusion speed, and the rate of rotation of the dies, and by the use of a haul-off means (not shown). The extrusion speed may be controlled by altering the pressure difference across the dies. As the tube is extruded and pulled away from the dies by the haul-off means the tube extends and decreases in cross-section, and the change in cross-section of the tube causes the angle of the helix to alter. By selection of dies, reservoir pressure, rotation rate and haul-off speed, any angle of helix may be produced, but the optimum angle is 54° 44'.

After leaving the annular die 50a, the formed tube may pass through a cooling and/or sizing apparatus, and then on to the haul-off means, and finally to a coiling machine or a cut-off machine.

In a tube manufactured as above, during use shear strains and stresses transfer the tensile loads in a composite to the fibre. As a result of the shear strains around a fibre the tensile stress within the fibre is low at the end of the fibre and increases to a maximum towards the middle of the fibre length. Conversely the shear stress is at a maximum at the fibre ends but decreases to a minimum towards the centre of the fibre length. The total length of fibre does not therefore carry the maximum stress. The ineffective end portion summed over both ends of the fibre is known as the critical fibre length.

It has been shown that if the total length of the fibre is about 20 times as great as the critical fibre length then the fibre will behave as if continuous fibre were present in the composite. Experimentally determined values of critical fibre length are generally greater than 20 times the fibre diameter so that to be fully effective in this case fibres should have a total length at least 400 times the diameter.

Adhesion of the fibres to the material is also important in allowing maximum fibre stresses to be developed. Special precautions may therefore need to be taken to ensure that adhesion is adequate.

The material to be extruded is initially in a viscous state, and may be of any conventional extrusion material, such as thermoplastics materials, thermosetting materials or rubber compounds. In the case of thermosetting and rubber materials, vulcanisation or curing has to be effected in conventional known methods.

It will be appreciated that the passages formed through the dies must be such that the fibres have sufficient time to orientate themselves correctly while the material flows through the dies. The passages in the dies should be designed to avoid plug flow and turbulent flow, and have entry conditions to induce laminar flow early on to avoid bridging of fibres across the entry. Furthermore, the laminar flow conditions should be maintained as the material is extruded and consolidated into a single tube. In addition it has been found that a large number of fibres are orientated at and during entry into a passage, and hence it is desirable that the entry to the passages is smooth and rounded.

Figure 6:
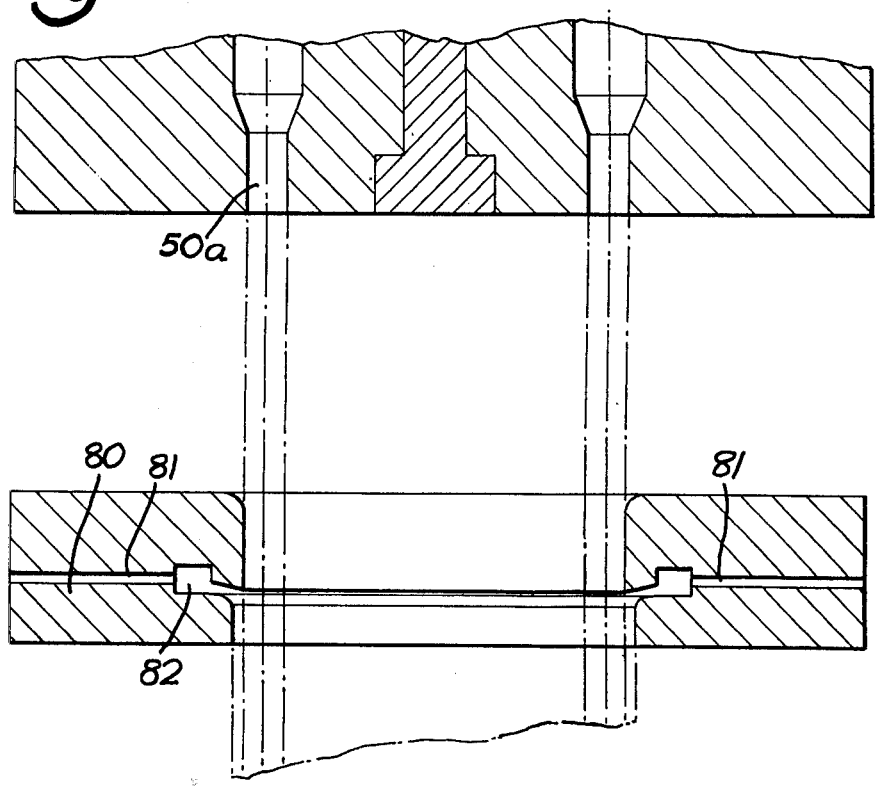
FIG. 6 shows diagrammatically a device for use with any of the above apparatus for applying an external barrier layer to a formed tube.

FIG. 6 shows a structure 80 which surrounds the formed tube. The structure has radial passages 81 which lead to an annular collection chamber 82. Material is fed into chamber 82 through passages 81 from a separate extruder and issues from the chamber 82 to form an external barrier layer around the tube. The structure 80 can be used in conjunction with any of the above described apparatus to apply an external barrier layer on the formed tubes issuing from the outlet passage 50 and in the case of the FIG. 4A embodiment the tube will have an internal and external barrier layer. The structure 80 may be spaced from the apparatus as shown in the drawing or may be immediately adjacent the outlet passage 50a or indeed the passages 81 and chamber 82 may be formed directly in the wall surrounding the outlet passage 50a instead of being a separate structure.

Figure 1C:
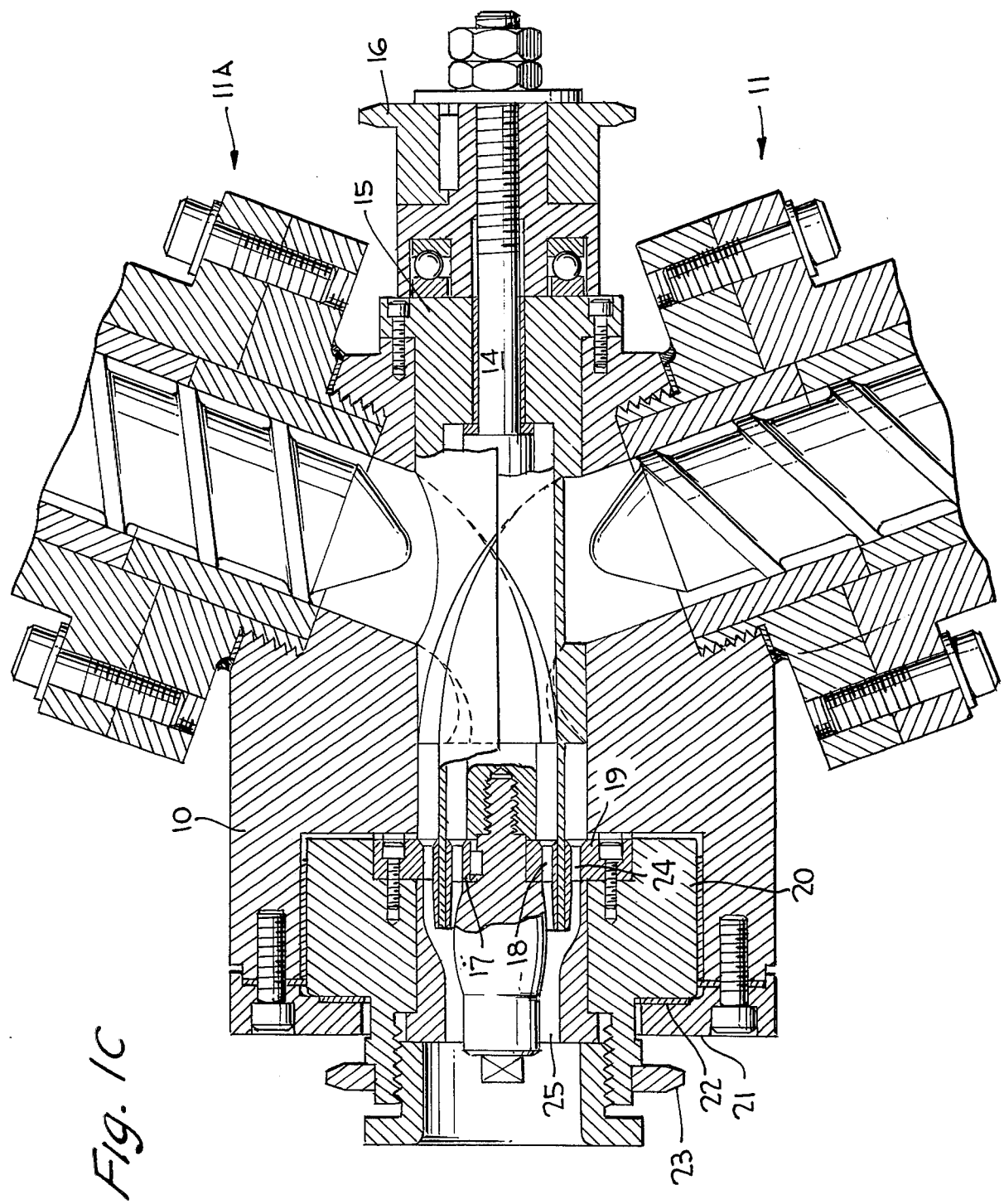
FIG. 1C is a view similar to FIG. 1 except that two inlets are shown for extruding two different materials.

In a further design of extruder, shown in FIG. 1C the feed to the dies is taken from two separate reservoirs one arranged to feed one die respectively by means of screw extruder assemblies 11 and 11A. The tube thus extruded comprises two different materials bonded together. In this latter arrangement, only one of the materials may contain reinforcing fibres.

We claim:

1. A method of making a reinforced tube comprising continuously extruding under laminar flow conditions at least one viscous material having reinforcing fibres through two concentric sets of converging discrete passages, said passages dividing said material flow into two spaced apart concentric sets of plural spaced streams having a lineal flow and causing the lineal flow rate of viscous material to gradually increase as it enters the passages to orient the fibres along the length of the passages, while maintaining laminar flow and bringing together said material from the respective passages so as to form two layers of material one within the other having fibres lying on helices of opposite hands respectively extruding the layers as a tube and hauling-off the extruded tube through a resizing die at a regulated rate to control the angle of the helices on which the fibres lie, and allowing said layers to consolidate into a single tube.

2. A method as claimed in claim 1 wherein the material is extruded through passages having a maximum length/diameter ratio of 10.

3. A method as claimed in claim 1 wherein the volume flow rate of material through the inner set of passages is at least the same as the volume flow rate of material through the outer set of passages.

4. A method as claimed in claim 1 wherein said viscous material is gradually constricted into the openings of said passages to thereby avoid any turbulent flow during extrusion.

5. A method as claimed in claim 1 wherein the hauling-off of the extruded layers is regulated to maintain said helix angles at 54° 44'.

6. A method as claimed in claim 1, wherein the viscous material is continuously extruded through a plurality of passages arranged in two annular sets, one set disposed within the other, so that two layers each comprising several side-by-side helically wound portions are formed one within the other by the material extruded through the passages of the two sets respectively.

7. A method as claimed in claim 1 wherein the material extruded is caused to be formed into said two layers by rotating the passages in opposite directions about a common axis.

8. A method as claimed in claim 1 wherein said passages are held stationary, the extruded material being passed through an annular die the inner wall of which is rotated in one direction and the outer wall of which is rotated in another opposite direction such that the extruded material is formed into two tubes.

9. A method as claimed in claim 1 wherein the material is extruded through two annular passageways one within the other, which are rotated in opposite directions about a common axis so that two layers are formed one within the other by the material extruded through the passageways.

10. A method as claimed in claim 1 wherein the two layers are caused to consolidate at least in part by passing them through a die having an annular orifice.

11. A method as claimed in claim 1 wherein the at least partly consolidated tube is pulled axially through a sizing die to form the tube into a predetermined size and cross-section.

12. A method as claimed in claim 1 wherein two separate viscous materials, at least one of which contains discrete lengths of fibres, are continuously extruded each through at least one passage respectively whereby the two layers are wound from different materials.

13. A method as claimed in claim 1 wherein a barrier layer of a further material is formed on at least one of the walls of the single tube.

14. A method as claimed in claim 13 wherein said barrier layer is formed by an additional step of co-extruding while the two layers are being consolidated into a single tube.

15. A method as claimed in claim 13 wherein said barrier layer is formed by an additional step of co-extruding before the two layers are consolidated into a single tube.

* * * * *